United States Patent

Hashiguchi et al.

(10) Patent No.: US 9,690,151 B2
(45) Date of Patent: Jun. 27, 2017

(54) LIQUID CRYSTAL DISPLAY DEVICE

(71) Applicant: Mitsubishi Electric Corporation, Tokyo (JP)

(72) Inventors: Takafumi Hashiguchi, Tokyo (JP); Takeshi Shimamura, Tokyo (JP); Naruhito Hoka, Tokyo (JP); Hirofumi Iwanaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 164 days.

(21) Appl. No.: 14/619,524

(22) Filed: Feb. 11, 2015

(65) Prior Publication Data

US 2015/0241746 A1    Aug. 27, 2015

(30) Foreign Application Priority Data

Feb. 27, 2014   (JP) .................................. 2014-036129

(51) Int. Cl.

| | | |
|---|---|---|
| *G02F 1/1345* | (2006.01) | |
| *G02F 1/1362* | (2006.01) | |
| *G02F 1/1339* | (2006.01) | |
| *G02F 1/1343* | (2006.01) | |

(52) U.S. Cl.
CPC ...... *G02F 1/136204* (2013.01); *G02F 1/1339* (2013.01); *G02F 1/134363* (2013.01); *G02F 2001/134372* (2013.01)

(58) Field of Classification Search
CPC .............. G02F 1/13452; G02F 1/1345; G02F 1/136204; G02F 1/1339; G02F 1/134363; G02F 2001/134372
USPC ......................................................... 349/149
See application file for complete search history.

(56) References Cited

U.S. PATENT DOCUMENTS

| | | |
|---|---|---|
| 5,870,160 A | 2/1999 | Yanagawa et al. |
| 6,034,757 A | 3/2000 | Yanagawa et al. |
| 6,108,066 A | 8/2000 | Yanagawa et al. |

FOREIGN PATENT DOCUMENTS

| | | | |
|---|---|---|---|
| JP | H09-105918 A | | 4/1997 |
| JP | 2008-046278 A | | 2/2008 |
| JP | 200846278 | * | 2/2008 |
| JP | 2010-049185 A | | 3/2010 |

* cited by examiner

*Primary Examiner* — Nathanael R Briggs
*Assistant Examiner* — William Peterson
(74) *Attorney, Agent, or Firm* — Studebaker & Brackett PC

(57) ABSTRACT

A liquid crystal panel includes an array substrate and a counter substrate facing the array substrate that are bonded to each other through a seal located along a peripheral edge. Vcom wiring and GND wiring are provided in a peripheral region of the array substrate. The Vcom wiring is provided between a display region and the GND wiring. The GND wiring extends beyond an edge of the seal.

9 Claims, 5 Drawing Sheets

LIQUID CRYSTAL DISPLAY DEVICE

BACKGROUND OF THE INVENTION

Field of the Invention

The present invention relates to a liquid crystal display device, and more particularly, to a liquid crystal display device capable of preventing malfunctions caused by aerial discharge.

Description of the Background Art

In a traditional liquid crystal display device, an array substrate with thin film transistors (TFTs) formed thereon and a counter substrate are bonded to each other through a seal along the peripheral portions of these substrates, forming a container for sealing liquid crystals. In general, common wiring (Vcom wiring) is located on the outermost periphery of the array substrate.

The liquid crystal display devices in recent times are required to have a wide viewing angle, so that liquid crystal panels employing the fringe field switching (FFS) mode are commonly used. In the liquid crystal panel employing the FFS mode, both a pixel electrode and a common electrode that control the alignment of the liquid crystals are provided on the array substrate. These two electrodes are laminated via an insulating film therebetween. One of the electrodes that is provided as the upper layer has slits formed therein. A rubbing treatment is performed in the direction that is substantially parallel to the long-side direction of the slits. When the electric potential between the electrodes is the OFF potential, the liquid crystal molecules are aligned in the direction that is substantially parallel to the long sides of the slits. When the electric potential larger than the OFF potential is applied between the electrodes, the electric field (transverse electric field) is generated in the direction that is perpendicular to the long-side direction of the slits, causing the liquid crystal molecules to rotate (in a transverse direction) in the plane that is parallel to the substrate so as to agree with the electric field direction. The amount of transmitted light is regulated by controlling the rotation angle of the liquid crystal molecules. Besides the FFS mode, the in-plane switching (IPS) mode is known as the structure in which both the pixel electrode and the common electrode are provided on the array substrate.

In the liquid crystal display devices in which the FFS mode or the IPS mode is employed, the electrification of the surface of the panel is likely to cause display failures. Thus, a transparent conductive film is formed on the surface of the counter substrate on the side opposite to the liquid crystals and the transparent conductive film is grounded. A grounding method is known which connects GND wiring that is kept at the ground potential of the liquid crystal display device to the transparent conductive film (Japanese Patent Application Laid-Open No. 09-105918 (1997) (for example, FIG. 14).

In recent years, panels including the liquid crystal panels and organic electroluminescent (EL) panels have increasingly reduced size, thickness, and frame width. These panels are equipped with additional functions, such as a touch panel. This is accompanied with increasing number of cases in which static electricity (aerial discharge) from outside the panels (for example, from a human body) causes malfunctions of the panels. Such panels have recently come into use in car navigations and other on-board purposes. Therefore, the strict standard of withstand voltage in the aerial discharge test has been imposed.

According to the aerial discharge tests performed on the liquid crystal panel, static electricity tends to be discharged to the conductive portions of the liquid crystal panel. That is, static electricity is likely to be discharged to the conductive portions of the array substrate and the counter substrate that extend beyond the seal (insulator) and is less likely to be discharged to the portions covered with the seal.

The Vcom wiring is provided along the peripheral portion of the panel on the array-substrate side. A part of the Vcom wiring commonly extends beyond the edge of the seal. Consequently, electric charge generated by electric discharge is transmitted through the Vcom wiring on the array-substrate side and enters a driver integrated circuit (IC) that is chip-on-glass (COG) mounted, is chip-on-film (COF) mounted, or is disposed on a circuit board, possibly causing a malfunction or a breakdown of the driver IC.

As an approach to such a problem, a technique is known by which the Vcom wiring is formed inside of the seal and the GND wiring is formed to surround the outer periphery of the Vcom wiring (Japanese Patent Application Laid-Open No. 2008-46278).

According to Japanese Patent Application Laid-Open No. 2008-46278, a pattern to serve as the GND wiring is located along the outer periphery of the panel. However, patterns of the conductive transparent film located outside of the seal are locally disposed only on the corners of the panel. Such wiring does not have sufficient effect in dissipating static electricity. Moreover, the conductive transparent film, which is formed to be in direct contact with the seal, has a drawback in terms of adhesion. More particularly, while an insulating film composed of, for example, SiN, has an excellent adhesiveness to epoxy resin commonly used as sealing material, a transparent conductive film composed of, for example, indium tin oxide (ITO) that is in direct contact with the seal has insufficient adhesion to the seal, whereby defects such as bubbles and seal punctures are more likely to occur.

SUMMARY OF THE INVENTION

The present invention has an object to avoid the problems described above and to provide a liquid crystal display device capable of preventing malfunctions caused by electric discharge.

A liquid crystal display device according to the present invention includes: a liquid crystal panel including an array substrate and a counter substrate facing the array substrate that are bonded to each other through a seal located along a peripheral edge; and a circuit board connected to the liquid crystal panel. The liquid crystal panel includes a display region and a peripheral region surrounding the display region. Vcom wiring and GND wiring are provided in the peripheral region to surround the display region. The Vcom wiring is provided between the display region and the GND wiring. The GND wiring surrounds the display region while extending beyond an outermost periphery portion of the seal. The GND wiring is provided independently of a circuit that drives the liquid crystal panel and is connected to a ground potential of the circuit board.

Such configuration provides the liquid crystal display device capable of preventing malfunctions caused by electric discharge.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
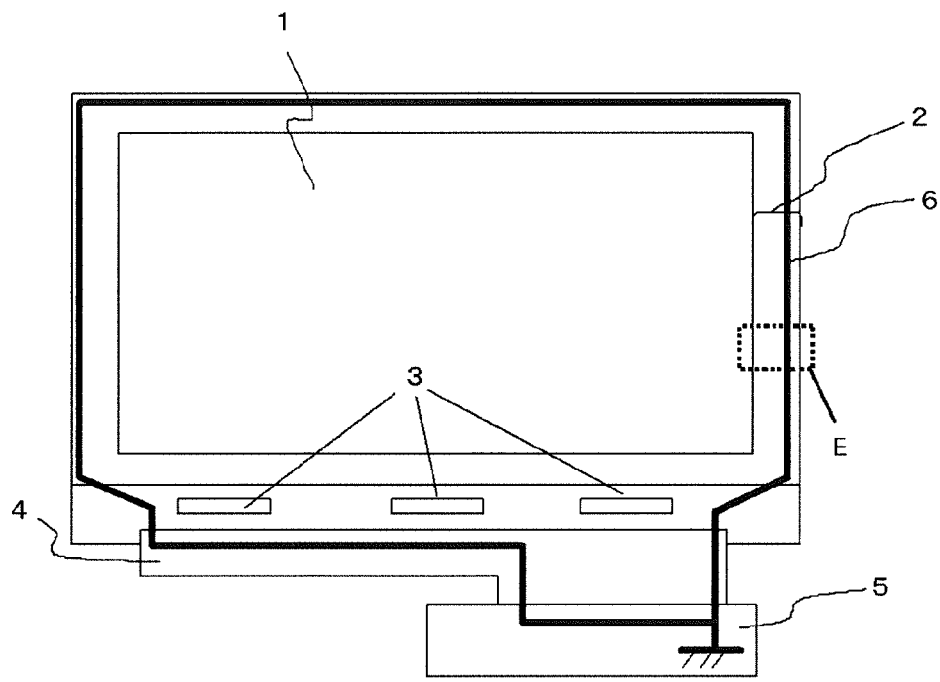
FIG. 1 is a schematic view of a liquid crystal display device according to a first preferred embodiment.
Figure 2:
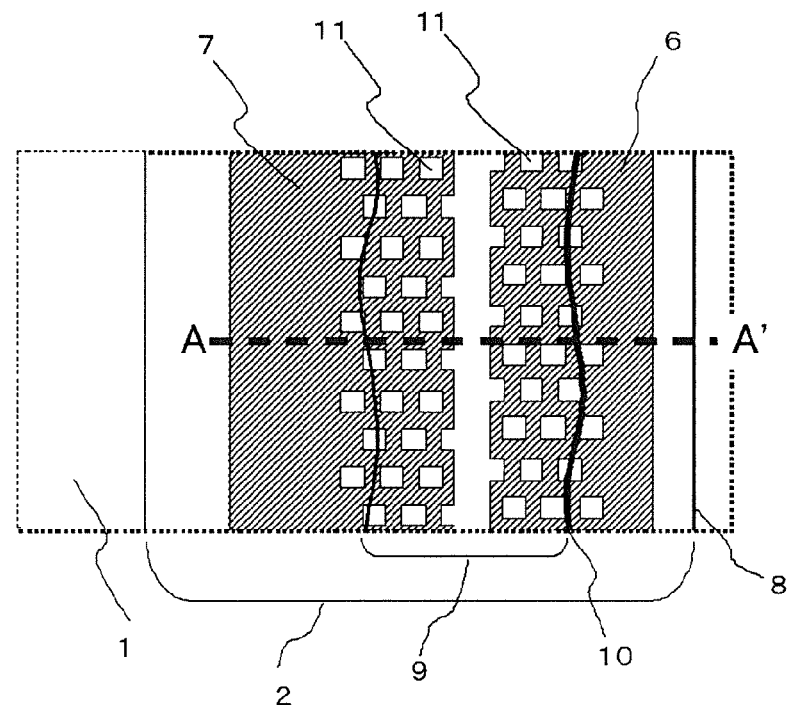
FIG. 2 is a plan view of the liquid crystal display device according to the first preferred embodiment.
Figure 3:
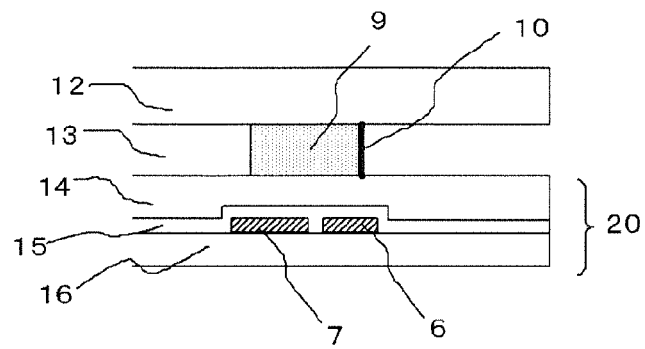
FIG. 3 is a cross-sectional view of the liquid crystal display device according to the first preferred embodiment.

With reference to the drawings, a first preferred embodiment of the present invention is described below. FIG. 1 is a schematic view describing a liquid crystal display device according to the first preferred embodiment. FIG. 2 is an enlarged plan view of a region E indicated in FIG. 1. FIG. 3 is a cross-sectional view taken along the line A-A' shown in FIG. 2.

As shown in FIG. 3, an array substrate 20 and a counter substrate 12 are connected to each other through a seal 9. As shown in FIG. 1, the liquid crystal panel formed of such lamination is divided into a display region 1 and a peripheral region 2 surrounding the display region 1. The display region 1 is the region that corresponds to the display screen of the liquid crystal display device. Although not shown in the drawings, the seal 9 mentioned above is formed to surround the display region 1. As shown in FIG. 3, liquid crystals 13 are sealed inside of the seal 9.

Although not shown in FIG. 1, a plurality of interconnections including scanning lines, signal lines, and Vcom wiring cross each other in the display region 1. Switching elements such as TFTs are formed in the vicinity of intersections of the scanning lines and the signal lines. A voltage required for image displaying is applied onto the liquid crystals 13 as appropriate. ICs 3 serving as drive circuits that are COG-mounted on, for example, interconnections extending from the display region 1 are located in the peripheral region 2. A FPC 4 is connected to the liquid crystal panel to be in electrical connection with the ICs 3. A circuit board 5 is connected with the FPC 4. Thus, the liquid crystal panel is connected with the circuit board 5 through the FPC 4. Note that, various kinds of wiring bodies may be included in place of the FPC 4.

As shown in FIG. 1, GND wiring 6 is formed in the periphery region 2 to surround the display region 1. The GND wiring 6 electrically extends on the circuit board 5 through the FPC 4 and is connected to the ground terminal of the circuit board 5, thereby being grounded. Such grounding is formed to dissipate accumulated static electricity. The GND wring 6 is provided independently of the circuit that drives the liquid crystal panel. Although not shown in FIG. 1, the Vcom wiring is similarly disposed to surround the display region 1 as described later.

Next, with reference to FIGS. 2 and 3, the following describes the structure of the vicinity of the GND wiring 6 and the seal 9. In addition to the GND wiring 6, Vcom wiring 7 is formed in the region E indicated in FIG. 1 to surround the display region 1. When each pixel in the display region 1 applies a voltage onto the liquid crystals 13, the Vcom wiring 7 is connected to the electrode that is capacitively coupled with each pixel via the liquid crystals, so that the Vcom wiring 7 is separate from the GND wiring 6 having the ground potential. In a case where the array substrate includes, for example, inverted staggered thin-film transistors, which are not shown in the drawings, the GND wiring 6 and the Vcom wiring 7 may be the film, which is formed simultaneously with the scanning lines, made of the same material as that of the scanning lines. Such film may be made of aluminum or aluminum alloy.

The pattern shown in FIG. 3 is not the structure to be locally provided in the region E. In the liquid crystal panel, the entire perimeter of the display region 1 is doubly surrounded by the GND wiring 6 and the Vcom wiring 7 and the Vcom wiring 7 is formed to surround the GND wiring 6. In addition, the seal 9 is formed to surround the display region 1. Thus, the array substrate 20 and the counter substrate 12 are bonded to each other through the seal 9 provided along the peripheral edge portion and the liquid crystals 13 are sealed inside of the seal 9.

The GND wiring 6 is located closer to the vicinity of a panel outline edge 8 relative to the Vcom wiring 7 and extends beyond a seal's outer edge 10 that is the outermost edge portion of the seal 9. The GND wiring 6 surrounds the display region 1 while extending beyond the seal's outer edge 10. In other words, the GND wiring 6 is formed such that the portion thereof extending beyond the seal 9 also surrounds the display region 1. In general, electric charge caused by aerial discharge is conceivably propagated through the seal's outer edge 10 to enter the liquid crystal panel. Such an enclosing arrangement can more reliably dissipate charge of static electricity through the GND wiring 6.

Although the seal 9 is located to bridge over the Vcom wiring 7 and the GND wiring 6, the Vcom wiring 7 may not overlap the seal 9. The GND wiring 6 inside of the seal 9 has slits 11 formed therein to allow UV light to penetrate such that the seal 9 is cured by UV light irradiation.

As shown in FIG. 3, the Vcom wiring 7 and the GND wiring 6 are formed on a substrate 16 and a lower-layer insulating film 15 and an upper-layer insulating film 14 are laminated to cover the Vcom wiring 7 and the GND wiring 6. The Vcom wiring 7 and the GND wiring 6 may be formed of the film made of the same material as that of the metal film included as the scanning lines and the signal lines in the display region 1. An inorganic film consisting of, for example, SiN or SiO and an organic film consisting of, for example, resin may serve as the upper-layer insulating film 14 and the lower-layer insulating film 15. The seal 9 is bonded to the upper-layer insulating film 14, thereby providing excellent adhesiveness. This suppresses defects such as bubbles and seal punctures.

In the first preferred embodiment, the GND wiring 6 is provided inside of the seal 9 to surround the outer side of the Vcom wiring 7, and the GND wiring 6 surrounds the display region while extending beyond the seal's outer edge 10, to thereby prevent malfunctions caused by aerial discharge. In addition, defects such as bubbles in the seal and seal punctures can be suppressed.

Second Preferred Embodiment

According to the first preferred embodiment, the Vcom wiring 7 and the GND wiring 6 are formed in the same layer. In this configuration, static electricity that has entered the GND wiring 6 penetrates into the Vcom wiring 7 in the same layer, possibly causing a malfunction or a breakdown of the ICs 3. Thus, in a second preferred embodiment, the Vcom wiring 7 and the GND wiring 6 are formed as separate layers.

Figure 4:
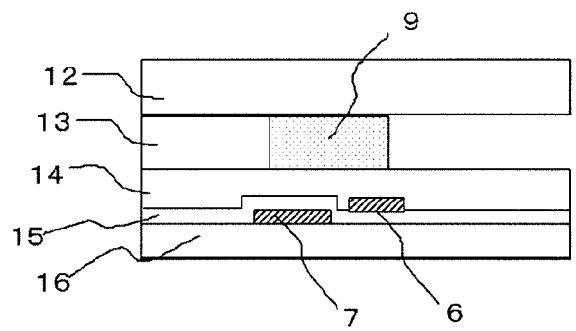
FIG. 4 is a cross-sectional view of the liquid crystal display device according to a second preferred embodiment.

FIG. 4 is a cross-sectional view of the region E indicated in FIG. 1. In the second preferred embodiment, as shown in FIG. 4, the GND wiring 6 is formed as an upper layer relative to the Vcom wiring 7 and the lower-layer insulating film 15 is formed between these wiring. That is, the GND wiring 6 and the Vcom wiring 7 are formed as separate layers with the lower-layer insulating film 15 therebetween. An inorganic film consisting of, for example, SiN or SiO and an organic film may serve as the lower-layer insulating film 15.

In the second preferred embodiment, the GND wiring 6 and the Vcom wiring 7 are formed as separate layers. This configuration suppresses static electricity that is propagated to the Vcom wiring 7, providing the liquid crystal display device capable of preventing malfunctions caused by electric discharge.

Third Preferred Embodiment

Figure 5:
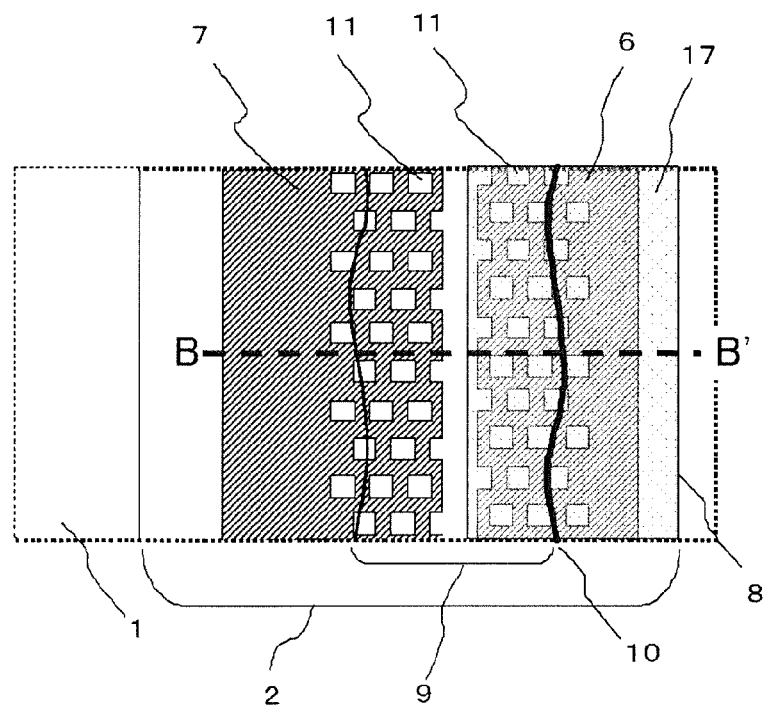
FIG. 5 is a plan view of the liquid crystal display device according to a third preferred embodiment.
Figure 6:
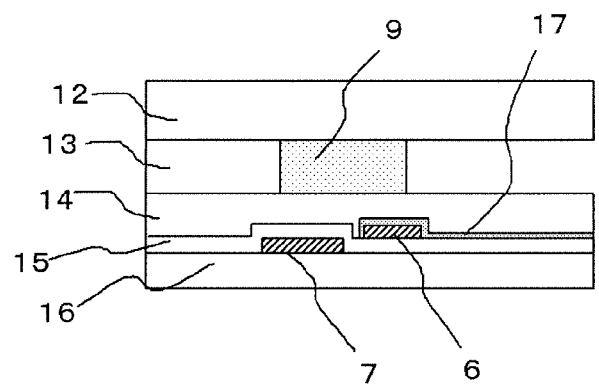
FIG. 6 is a cross-sectional view of the liquid crystal display device according to the third preferred embodiment.

FIG. 5 is a plan view showing a configuration according to a third preferred embodiment. FIG. 6 is a cross-sectional view taken along the line B-B' shown in FIG. 5. The GND wiring 6 provided in the peripheral region 2 is located closer to the vicinity of the panel outline edge 8 relative to the Vcom wiring 7 and extends beyond the seal's outer edge 10. The GND wiring 6 inside of the seal 9 has the slits 11 formed therein to allow UV light to penetrate such that the seal is cured by UV irradiation.

Figure 7:
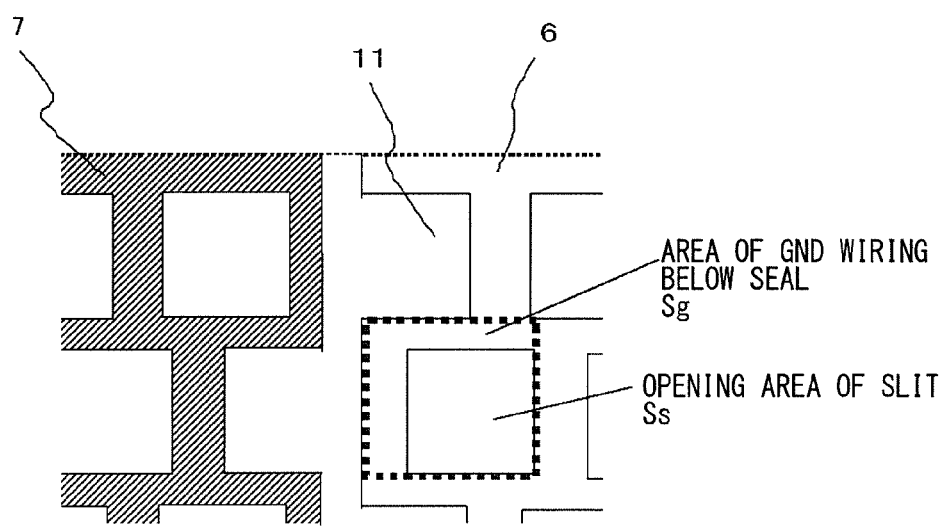
FIG. 7 is a plan view showing slits in the liquid crystal display device according to the third preferred embodiment.

FIG. 7 is an enlarged plan view of the slits 11. As shown in FIG. 7, the slit 11 is formed to have an opening area Ss that is larger than an area Sg of the GND wiring 6 located below the seal 9. A transparent conductive film 17 formed of high-melting point material is laminated as an upper layer relative to the GND wiring 6. The transparent conductive film 17 extends to the panel outline edge 8.

The Vcom wiring 7 and the GND wiring 6 are formed of the same film as the conductive film included in the display region 1. As in the second preferred embodiment, the GND wiring 6 is formed as an upper layer relative to the Vcom wiring 7 and the lower-layer insulating film 15 is formed between these wiring. Although the seal 9 is located to bridge over the Vcom wiring 7 and the GND wiring 6, the Vcom wiring 7 may not overlap the seal 9.

As shown in FIG. 5, the GND wiring 6 is located in the outermost periphery of the peripheral region 2. The transparent conductive film 17 laminated on the GND wiring 6 that is in electrical connection extends to the panel outline edge 8. Such configuration provides connection with the panel housing GND, thereby enhancing the grounding (GND) and thus providing the liquid crystal display device more capable of preventing malfunctions caused by electric discharge.

Fourth Preferred Embodiment

Figure 8:
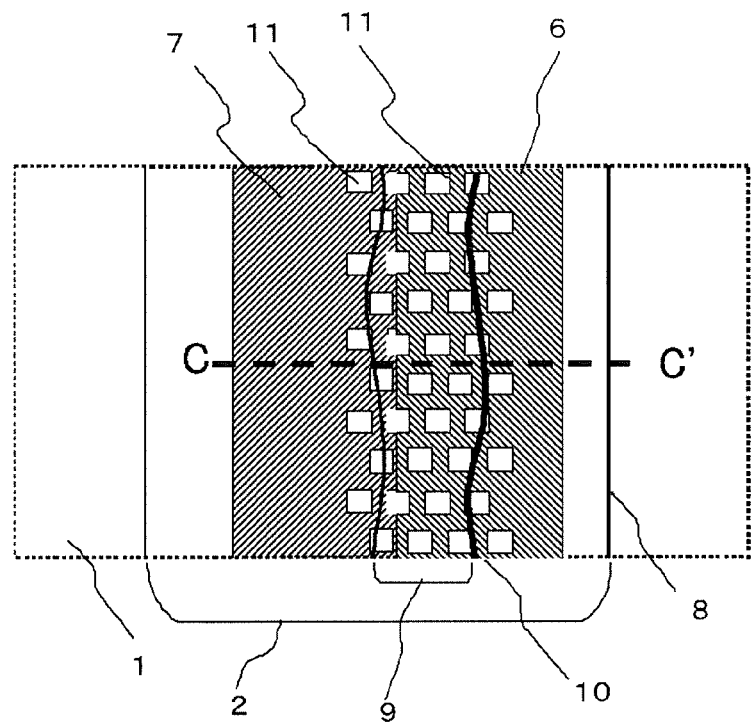
FIG. 8 is a plan view of the liquid crystal display device according to a fourth preferred embodiment.
Figure 9:
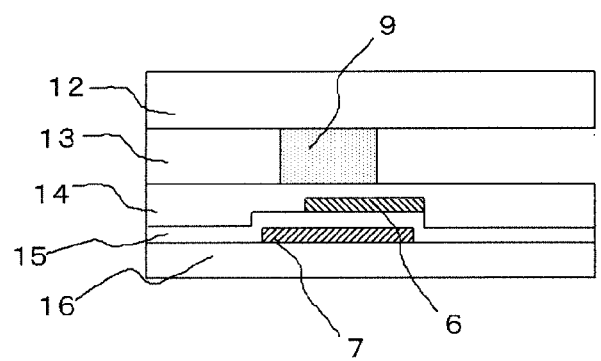
FIG. 9 is a cross-sectional view of the liquid crystal display device according to the fourth preferred embodiment.

FIG. 8 is a plan view of the liquid crystal display device according to a fourth preferred embodiment. FIG. 9 is a cross-sectional view taken along the line C-C' shown in FIG. 8. The GND wiring 6 provided in the peripheral region 2 is located closer to the vicinity of the panel outline edge 8 relative to the Vcom wiring 7 and extends beyond the seal's outer edge 10. The GND wiring 6 inside of the seal 9 has the slits formed therein to allow the seal to be cured by UV irradiation. The Vcom wiring 7 and the GND wiring 6 are formed of the same film as the conductive film included in the display region 1. The GND wiring 6 is formed as an upper layer relative to the Vcom wiring 7 and the lower-layer insulating film 15 is formed between these wiring.

The above configuration is similar to that of the second preferred embodiment. In the fourth preferred embodiment, meanwhile, the GND wiring 6 partially overlaps the Vcom wiring 7. Thus, as shown in FIG. 9, the GND wiring 6 is formed as an upper layer relative to the Vcom wiring 7 with the lower-layer insulating film 15 therebetween and the GND wiring 6 and the Vcom wiring 7 partially overlap each other via the interlayer insulating film 15 therebetween. The GND wiring 6 and the Vcom wiring 7 may overlap partially or entirely.

As shown in FIGS. 8 and 9, a part of the GND wiring 6 overlaps the Vcom wiring 7. This configuration reduces the width of the peripheral region 2 to narrow the frame, providing the liquid crystal display device capable of preventing malfunctions caused by electric discharge.

Fifth Preferred Embodiment

Figure 10:
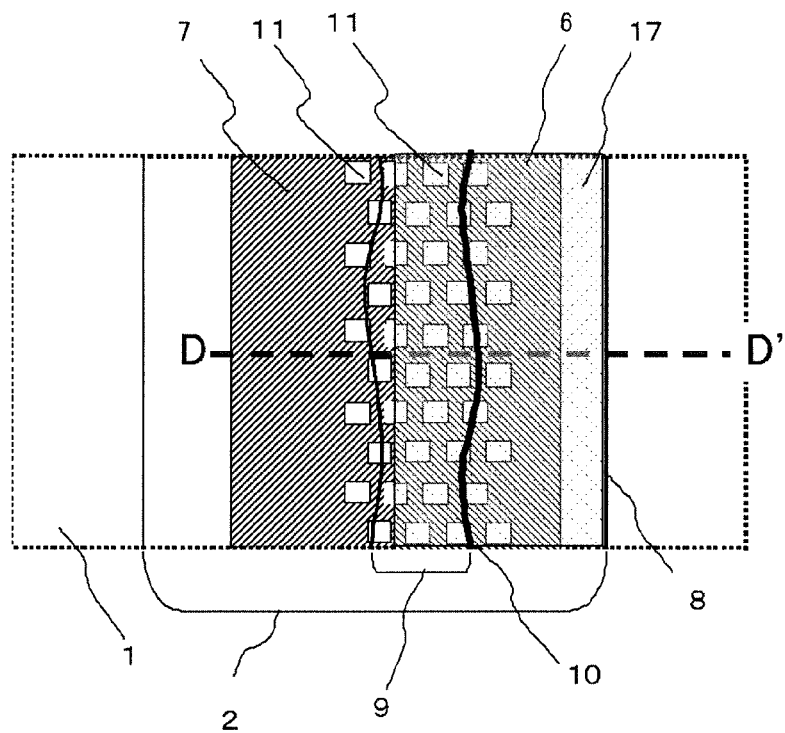
FIG. 10 is a plan view of the liquid crystal display device according to a fifth preferred embodiment.
Figure 11:
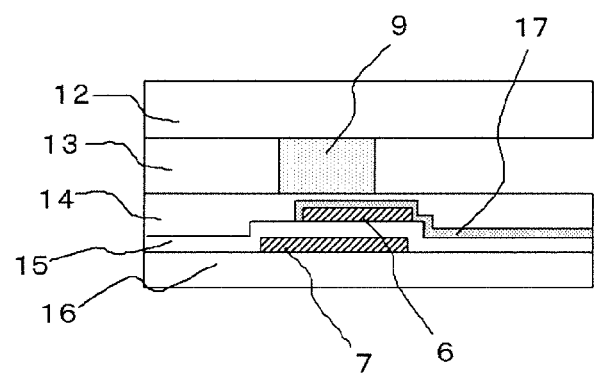
FIG. 11 is a cross-sectional view of the liquid crystal display device according to the fifth preferred embodiment.

FIG. 10 is a plan view according to a fifth preferred embodiment and FIG. 11 is a cross-sectional view taken along the line D-D' shown in FIG. 10. The GND wiring 6 provided in the peripheral region 2 is located closer to the vicinity of the panel outline edge 8 relative to the Vcom wiring 7 and extends beyond the seal's outer edge 10. The GND wiring 6 inside of the seal 9 has the slits formed therein to allow the seal to be cured by UV irradiation. The transparent conductive film 17 formed of high-melting point material is laminated on the GND wiring 6 and the transparent conductive film extends to the panel outline edge 8. The Vcom wiring 7 and the GND wiring 6 are formed of the same film as the conductive film included in the display region 1. The GND wiring 6 is formed as an upper layer relative to the Vcom wiring 7 and the lower-layer insulating film 15 is formed between these wiring.

The above configuration is similar to that of the third preferred embodiment. In the fifth preferred embodiment, meanwhile, the GND wiring 6 partially overlaps the Vcom wiring 7 as in the fourth preferred embodiment. As shown in FIGS. 10 and 11, a part of the GND wiring 6 overlaps the Vcom wiring 7, thereby reducing the width of the peripheral region 2 and thus narrowing the frame. The transparent conductive film 17 laminated on the GND wiring 6 that is in electrical connection extends to the panel outline edge 8, thereby providing connection with the panel housing GND and thus enhancing the grounding (GND). This configuration provides the liquid crystal display device capable of preventing malfunctions caused by electric discharge.

Although any of FFS panels, transmissive panels, reflective panels, and transflective panels may serve as the liquid crystal panel, the present invention is particularly effective for the modes, such as the FFS mode and the IPS mode, that are vulnerable to static electricity. In such liquid crystal panel, a transparent conductive film may be formed on the back surface of the counter substrate and kept at the ground potential.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device comprising:

a liquid crystal panel including an array substrate and a counter substrate facing said array substrate that are bonded to each other through a seal located along a peripheral edge; and a circuit board connected to said liquid crystal panel, wherein said liquid crystal panel includes a display region and a peripheral region surrounding said display region, Vcom wiring and GND wiring are provided in said peripheral region to surround said display region, said Vcom wiring is provided between said display region and said GND wiring, said GND wiring surrounds said display region while extending beyond an outermost periphery portion of said seal, said GND wiring is provided independently of a circuit that drives said liquid crystal panel and is connected to a ground potential of said circuit board, said GND wiring is formed as a layer separate from said Vcom wiring with an insulating film therebetween, a top portion of said Vcom wiring is in contact with a bottom portion of said insulating film, and a top portion of said insulating film is in contact with a bottom portion of said GND wiring.

2. A liquid crystal display device comprising:

a liquid crystal panel including an array substrate and a counter substrate facing said array substrate that are bonded to each other through a seal located along a peripheral edge; and a circuit board connected to said liquid crystal panel, wherein said liquid crystal panel includes a display region and a peripheral region surrounding said display region, Vcom wiring and GND wiring are provided in said peripheral region to surround said display region, said Vcom wiring is provided between said display region and said GND wiring, said GND wiring surrounds said display region while extending beyond an outermost periphery portion of said seal, said GND wiring is provided independently of a circuit that drives said liquid crystal panel and is connected to a ground potential of said circuit board, said GND wiring provides a lamination having, as an upper layer, a transparent conductive film, and said transparent conductive film extends to a panel outline edge.

3. The liquid crystal display device according to claim 1, wherein said GND wiring is located to partially overlap said Vcom wiring.

4. The liquid crystal display device according to claim 2, wherein said GND wiring is located to partially overlap said Vcom wiring.

5. The liquid crystal display device according to claim 1, wherein said GND wiring located below said seal has a slit formed therein.

6. The liquid crystal display device according to claim 2, wherein said GND wiring located below said seal has a slit formed therein.

7. The liquid crystal display device according to claim 3, wherein said GND wiring located below said seal has a slit formed therein.

8. The liquid crystal display device according to claim 4, wherein said GND wiring located below said seal has a slit formed therein.

9. The liquid crystal display device according to claim 1, wherein a fringe field switching (FFS) mode or an in-plane switching (IPS) mode is employed.

* * * * *